United States Patent [19]

Umeha et al.

[11] Patent Number: 4,595,556
[45] Date of Patent: Jun. 17, 1986

[54] METHOD FOR MANUFACTURING CAMSHAFT

[75] Inventors: Genkichi Umeha, Tokyo; Shigeru Urano, Saitama; Osamu Hirakawa, Saitama; Shunsuke Takeguchi, Saitama, all of Japan

[73] Assignee: Nippon Piston Ring Co., Ltd., Tokyo, Japan

[21] Appl. No.: 688,136

[22] Filed: Jan. 2, 1985

[30] Foreign Application Priority Data

Jan. 12, 1984 [JP] Japan ................................ 59-2628

[51] Int. Cl.⁴ ............................................... B22F 7/00
[52] U.S. Cl. .......................................... 419/8; 419/5; 419/6; 419/46; 419/54; 419/55; 74/567
[58] Field of Search ...................... 419/53, 55, 5, 6, 54, 419/46; 74/567

[56] References Cited

U.S. PATENT DOCUMENTS 4,236,923 12/1980 Takahashi et al. ..................... 419/6
4,503,009 3/1985 Asaka ..................................... 419/5

Primary Examiner—Stephen J. Lechert, Jr.
Attorney, Agent, or Firm—Birch, Stewart, Kolasch & Birch

[57] ABSTRACT

A composite camshaft having a plurality of ferrous fitting members, such as cam lobes and journals, firmly bonded to a steel shaft by sintering in the presence of a liquid phase. The fitting members are fabricated as a green compact from metal powders and pre-sintered to axially shrink the compact by one-half a preselected allowance of shrinkage. Thereafter the pre-sintered fitting members are fitted on the shaft and sintered to axially shrink the compact by the remaining allowance of shrinkage and metallurgically join the shaft.

4 Claims, 5 Drawing Figures

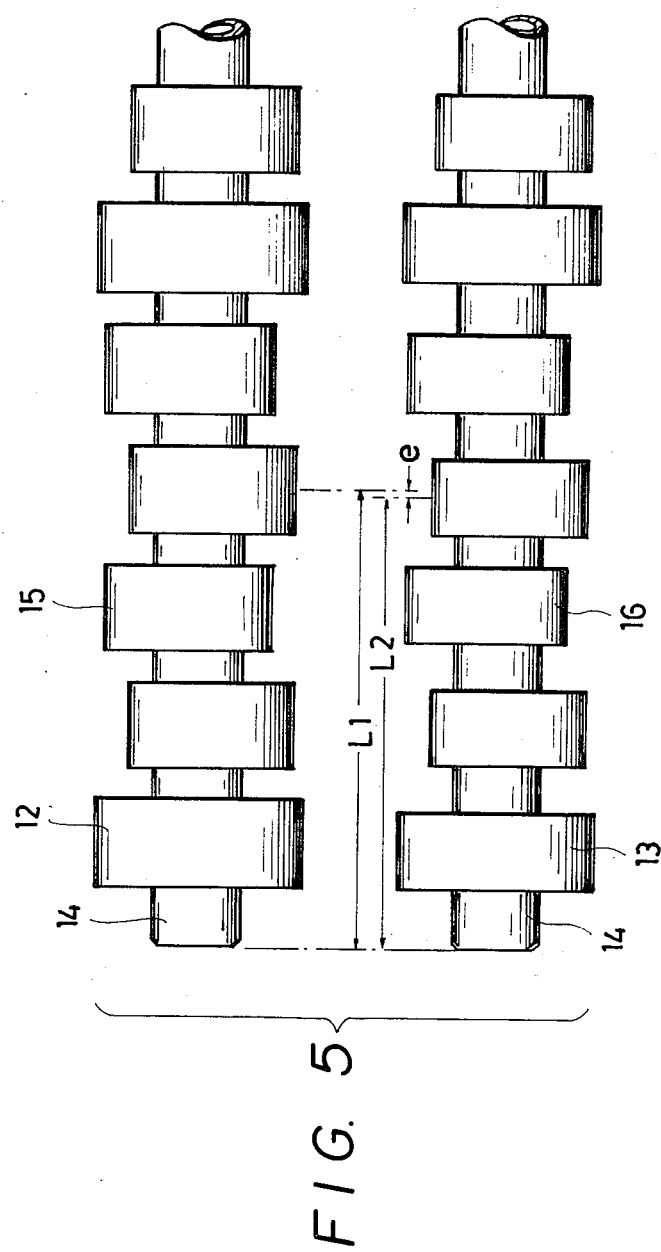

METHOD FOR MANUFACTURING CAMSHAFT

BACKGROUND OF THE INVENTION

1. Field of the Invention

The present invention relates to a method for manufacturing a camshaft of the type having a solid or tubular shaft of steel and a plurality of fitting members, such as cam lobes, journals and gears which are separately fabricated from metal powders and fitted on the shaft by a liquid-phase sintering process.

2. Description of the Prior Art

The composite camshaft as manufactured by the method disclosed under JP, B2, 58-13603 is provided with a steel shaft and a plurality of fitting members, such as cam lobes and journals, which are firmly bonded to the steel shaft by a liquid-sintering process. The fitting member is fabricated as a green compact from metal powders to have a bore for fitting engagement with the steel shaft and then sintered to yield a liquid phase and shrink, thereby being superior in wear resistance as well as bonding strength. When the green compact is sintered to shrink, it has a point in the bore which first adheres to the steel shaft to define a neutral cross-section of shrinkage in which there is no change in axial position and to which other cross-sections axially shift. The first adhering point or neutral cross-section is unexpectedly variable under treatment conditions. This gives the known camshafts a disadvantage in that the axial position or distance from the reference plane of each fitting member is not always held within a desired tolerance.

SUMMARY OF THE INVENTION

It is the primary object of the present invention to provide an improved method for manufacturing a camshaft in which the axial position of each fitting member is held within a desired tolerance.

The present invention is directed to a method for manufacturing a camshaft provided with a steel shaft and a plurality of fitting members fitted on the shaft, the method comprising the steps of fabricating a green compact of each fitting member from metal powders which yield a liquid phase and shrink when sintered, preliminarily sintering the green compact which has to a pre-sintered compact been shrunk by about 50% of a preselected axial allowance of shrinkage, fitting the pre-sintered compact on the steel shaft, and sintering the pre-sintered compact to a sintered compact shrinked by the remaining allowance of shrinkage and bonded to the shaft.

In the inventive method, the fitting member axially shrinks on the shaft by one-half the preselected allowance of shrinkage with the result that its deviation in axial position or distance from the reference plane is reduced by one-half as compared with that made by the known method.

The advantage offered by the invention is mainly that the camshaft has the fitting members firmly fixed to the shaft at the respective positions with a high accuracy. The axial distance of each fitting member from the reference plane is easily held within a desired tolerance.

BRIEF DESCRIPTION OF THE DRAWINGS

The invention will become more fully understood from the detailed description given hereinbelow and the accompanying drawings which are given by way of illustration only, and thus are not limitative of the present invention, and wherein:

FIG. 5 is a view diagrammatically showing an axial difference between the pre-sintered compact and the same after being sintered.

DETAILED DESCRIPTION OF THE INVENTION

Figure 1:
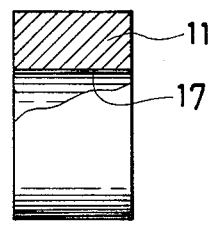
FIG. 1 is a partial sectional elevation showing the green compact in the first step of the method according to the invention.

Referring initially to FIG. 1 in which the first step of the inventive method is shown, a green compact 11 for making a journal is fabricated by press-working from metal powders which yield a liquid phase and shrink when sintered. The green compact 11 is formed with a bore 17 for pressure- or clearance-fitting engagement with a steel shaft, the bore being larger in diameter than the shaft. The metal powders are iron or a ferrous alloy containing 0.5–4.0% by weight of carbon, and 0.1–3.0% by weight of one or two elements selected from the group consisting of phosphorus, boron and silicon. The various individual components of the metal powders are selected to give the compact an appropriate allowance for shrinkage in a liquid phase sintering operation and to bond the same metallurgically to the shaft due to an elemental diffusion therebetween. The powders also allow the sintered compact to be superior in wear resistance as a sliding member. The presence of carbon is not only contribute to bondage as a diffusion element but also to wear resistance due to formation of chrome- and/or tungsten-carbide. If the amount of carbon is less than 0.5% by weight, the amount of the precipitation carbide is inadequate. On the other hand, if the amount of carbon exceeds 4.0% by weight, the excessive diffusion makes the compact more brittle after being sintered. Phosphorus, boron, and silicon are effective in lowering the liquid phase yielding temperature. However, the rate of liquid phase development is too small if the amount of phosphorous, boron and silicon is less than 0.1%. On the other hand, when their amount is greater than 3.0%, the rate of liquid phase development becomes too large to maintain a dimensional accuracy of the compact sintered. Furthermore, the green compact 13 is arranged to have a porosity of 12–20% by volume of pores, at least 40% of which consists of pores having a pore size of not more than 250 micron meter, so that it has 0.2–10% by volume of sintering pores the least of which consisting of pores having a pore size of not more than 100 micron meter when sintered, thereby being superior in pitting resistance and in oil retention.

Figure 2:
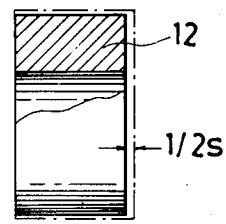
FIG. 2 is a partial sectional elevation showing the pre-sintered compact in the second step.

In the second step of FIG. 2, the green compact is preliminarily sintered to a pre-sintered compact 12 shrunk axially by about 50% ($\frac{1}{2}$s) of the preselected allowance s. The pre-sintering is conducted in a temperature range of 1000°–1120° C. When the temperature is lower the lower limit of 1000° C., neither liquid phase nor shrinkage of the green compact is obtained. On the other hand, if the green compact shrinks too much, i.e., when the temperature is higher than the upper limit of 1120° C., it will to be too loosely fitted on the shaft. The pre-sintered compact 12 is axially shorter by $\frac{1}{2}$s than the green compact as shown by dotted lines and also has the porosity thereof less than that of the green compact.

Figure 3:
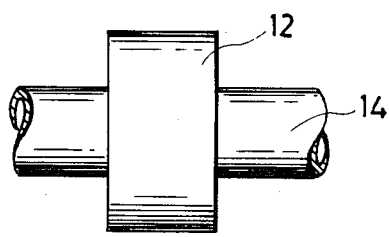
FIG. 3 is an elevation showing the pre-sintered compact fitted on the shaft in the third step.

In the third step of FIG. 3, the pre-sintered compact 12 is fitted at a predetermined position on the shaft 14 to produce a pre-sintered assembly.

Figure 4:
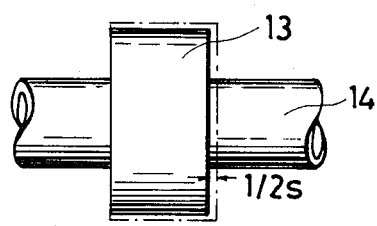
FIG. 4 is an elevation showing the sintered compact in the fourth step.

In the fourth step of FIG. 4 in which the pre-sintered compact is fully sintered to a sintered compact 13, the assembly is treated in a non-illustrated furnace at 1050°–1200° C. The lower limit temperature 1050° C. of the final sintering is higher than that of the pre-sintering. The higher limit 1200° C. is below a melting point of the compact but higher that of the pre-sintering. The final sintering causes the pre-sintered compact to yield a liquid phase again and shrink by the remaining allowance of shrinkage and reduce the porosity thereof as well as the volume. The sintered compact 13 is axially shorter by ½s than the pre-sintered compact as shown by dotted lines. During the sintering in the presence of a liquid phase in which the elements of the compact are allowed to diffuse and penetrate into the steel shaft, a metallurgically firm bond is produced between the shaft 14 and the sintered compact 13.

As seen in FIG. 5, the pre-sintered compacts 12 in the form of journal 12 and the pre-sintered compact 15 in the form of cam lobe are loosely fitted on the steel shaft 14 to form a pre-sintered assembly 10. The pre-sintered assembly is sintered to a completely sintered camshaft 20 with sintered compacts 13, 16, 10. Distance L1 between the pre-sintered compact and the end of the shaft 14 is not always equal to distance L2 between the same sintered compact and the end of the shaft 14, and therefore a difference e exists between L1 and L2. The difference results from the pre-sintered compact being axially shrunk by the remaining allowance of shrinkage with a neutral cross-section inclusive of a point which has first adhered on the steel shaft when sintered and that the first adhered point is unexpectedly variable between the axial length of the pre-sintered compact under various conditions. However, the difference e is not more than the half of predetermined allowance of shrinkage and relatively small in comparison with that of the conventional compact directly sintered from the green compact. Accordingly, the camshaft 20 can have the fitting members each fixed at a desired axial position with high accuracy.

From the foregoing, it will be understood that the present inventive method puts no restriction on the material composition of the above embodiment and that the fitting member, such as the cam lobe and the journal can be fabricated from iron or ferrous alloy powders which yield a liquid phase and shrink by an appropriate amount to produce a reliable joint between the fitting member and the shaft.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a camshaft comprising the steps of:
   forming a green compact of fitting members from a material which shrinks and yields a liquid phase when sintered;
   preliminarily sintering said green compact to form a pre-sintered compact which has been shrunk axially by about 50% of a predetermined allowance of shrinkage at a temperature yielding a liquid phase;
   fitting said pre-sintered compact on a steel shaft to produce a pre-sintered camshaft assembly; and
   sintering said pre-sintered camshaft assembly whereby said pre-sintered compact yields a liquid phase and is fully sintered to a sintered compact which is axially shrunk by the remaining allowance of shrinkage and metallurgically bonded to said steel shaft.

2. The method of claim 1, wherein said material comprises ferrous alloy powders containing 0.5–4.0% by weight of carbon and 0.1–3.0% by weight of at least one element selected from the group consisting of phosphorus, boron and silicon.

3. The method of claim 1, wherein said green compact has a porosity of 12–20% by volume of pores at least 40% of which consists of pores having a pore size of not more than 250 micron meter and said sintered compact has a porosity of 0.2–10% by volume of sintering pores at least 40% of which consists of pores having a pore size of not more than 100 micron meter, when sintered.

4. The method of claim 1, wherein said green compact is pre-sintered at 1000°–1120° C., said pre-sintered compact being sintered at 1050°–1200° C.

* * * * *